E. A. MARTIN.
TOOL GUARD.
APPLICATION FILED SEPT. 21, 1916.
1,270,430.
Patented June 25, 1918.
2 SHEETS—SHEET 2.
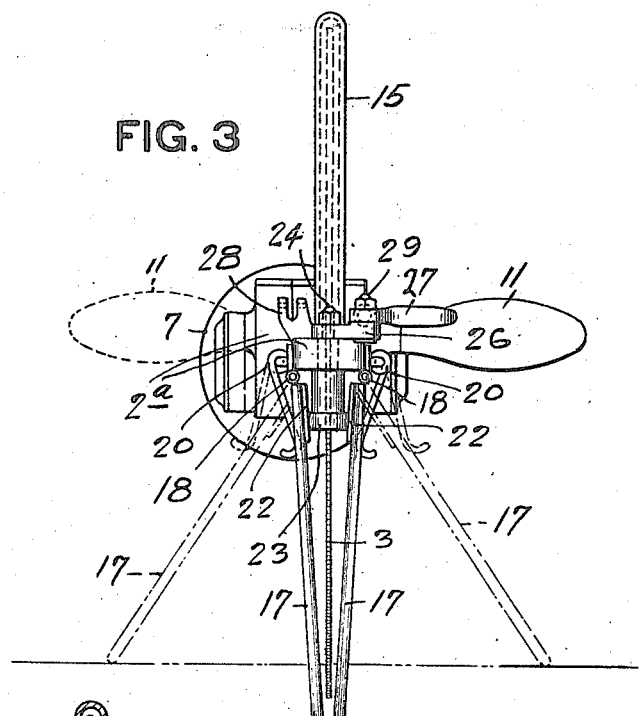
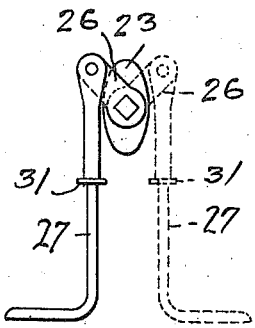
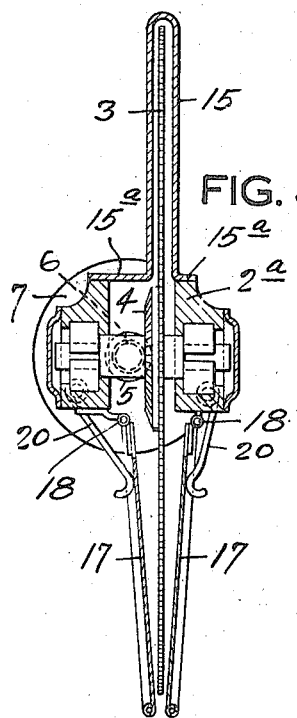
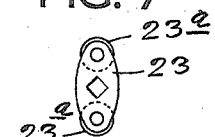
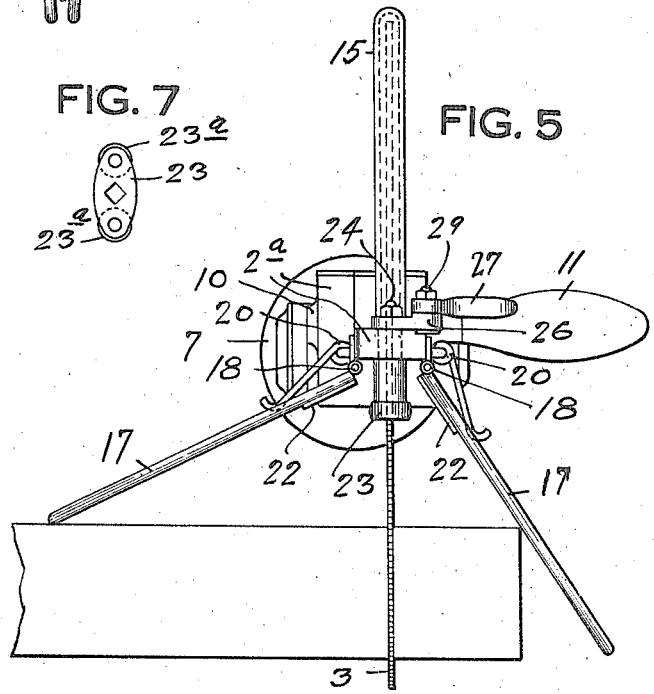
INVENTOR
Emanuel A. Martin
by Kay Totten + Powell
Attys

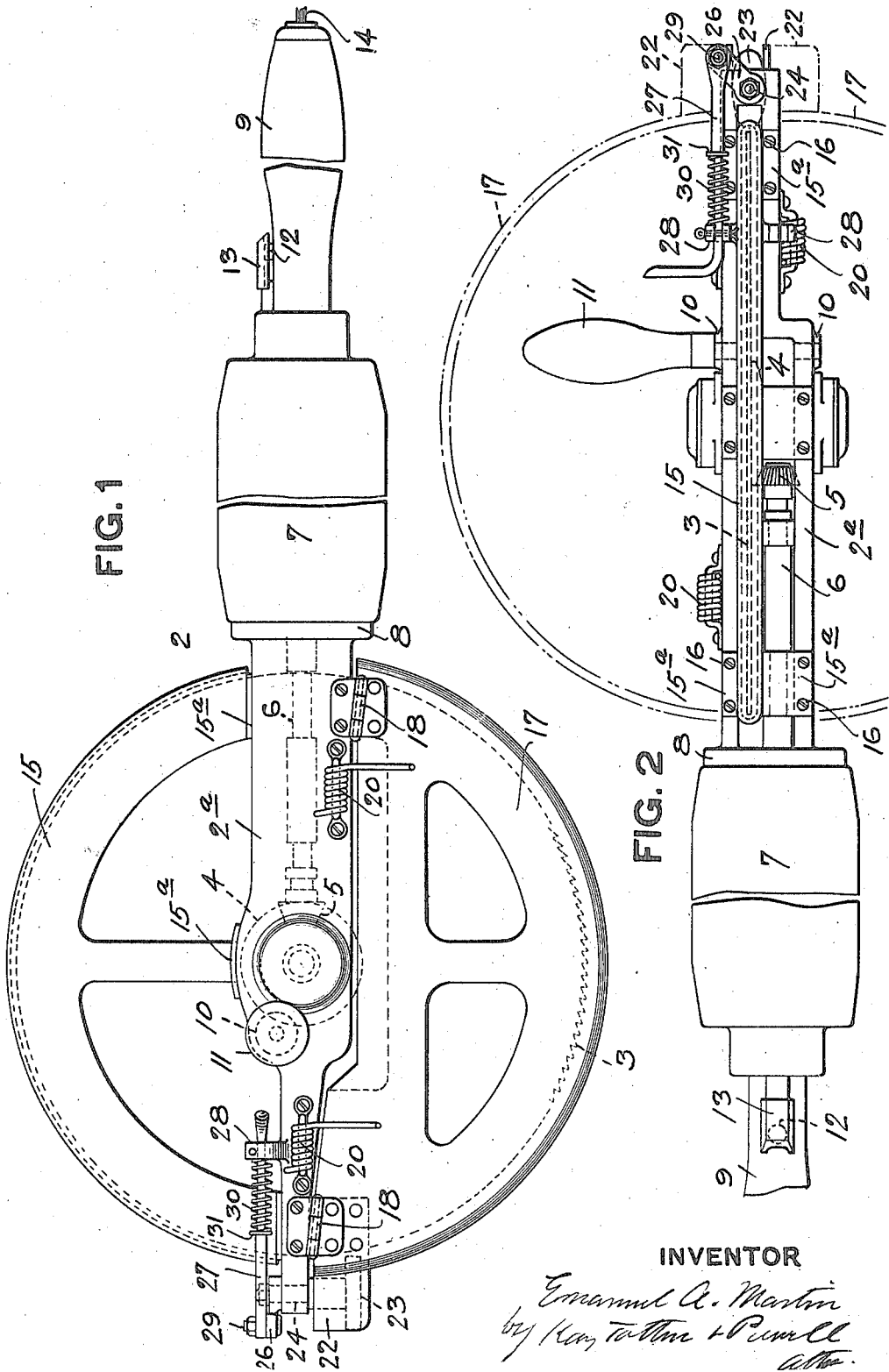

UNITED STATES PATENT OFFICE.

EMANUEL A. MARTIN, OF PITTSBURGH, PENNSYLVANIA.

TOOL-GUARD.

1,270,430.   Specification of Letters Patent.   Patented June 25, 1918.

Application filed September 21, 1916. Serial No. 121,436.

*To all whom it may concern:*

Be it known that I, EMANUEL A. MARTIN, a citizen of the United States, and resident of Pittsburgh, in the county of Allegheny and State of Pennsylvania, have invented a new and useful Improvement in Tool-Guards; and I do hereby declare the following to be a full, clear, and exact description thereof.

My invention relates to portable circular-saw guards, and has particular, although not exclusive, reference to portable saws and like tools known as hand tools.

The invention is illustrated in connection with a portable circular hand saw, such tool comprising a circular-saw mounted on a spindle journaled in a frame, and said frame supporting an electric motor which is connected by gearing or like connections for driving the saw, the motor receiving the current through a suitable flexible conductor. Handles are provided for manipulating the tool, and one of these handles, usually the handle longitudinally of the tool, is provided with a switch which is finger-pressed to supply current to the motor.

In the operation of the tool the operator grasps the handles and at the same time closes the switch to supply current to the motor. It has been found that there is great liability of injury to the operator by the revolving saw when the saw is withdrawn from the cut. This is due primarily to the natural grasp of the handles in supporting the tool and holding closed the electric switch, and, secondarily to carelessness in failure to open the switch and stop the saw, and in handling the saw when not in sawing position while the power is on, and also through accident.

The object of the invention is to provide protecting means which will at all times prevent contact with the saw blade when it is in motion and which permits ready use of the saw, and which effectively acts as a guard during sawing operations.

In the accompanying drawings, Figure 1 is a side view of a portable circular hand-saw; Fig. 2 is a plan view of the same; Fig. 3 is an end view; Fig. 4 is a vertical section taken on the center line of the saw looking toward the motor; Fig. 5 is an end view similar to Fig. 3, and shows the tool in sawing operation; and Figs. 6 and 7 are detail views of the guard actuating mechanism.

The numeral 2 indicates a suitable portable circular hand-saw comprising a bifurcated frame 2$^a$ and into which is mounted the circular saw 3. The saw is mounted on a shaft journaled in suitable bearings and has secured thereto a bevel gear 4 which is in mesh with the bevel pinion 5 on the shaft 6.

This shaft is journaled in the frame and may be driven from the motor in any suitable manner, preferably, however, direct connection to the motor shaft is made when the cutting-tool is a saw, and the motor in this instance is indicated generally as at 7 and is connected to the frame as at 8. The motor is provided with the handle 9 and the frame is provided with bosses 10 adapted to receive the handle 11 in either a right-handed or a left-handed position.

In order to operate these tools electrically, suitable switch mechanism is provided which may be conveniently controlled by the operator; such a switch is indicated in the drawing as a push button 12 covered by a guard piece 13.

Current is supplied to the motor by the flexible conductor 14.

The saw-blade extending above the frame is covered by a guard-member 15 which is rigidly secured to said frame in any desired manner and may be made in one or several pieces, the construction shown consisting of a single member attached by flanges 15$^a$ secured by screws 16.

The lower half or cutting side of the saw is protected by swinging guard-members 17; two of such members are shown, one each side of the saw. The members are attached to the frame by hinges 18 and are of larger area than that part of the saw which they protect, and are so made to ward off edgewise contact with the saw, and provide for close guarding of the lower center of the saw in closed position. By referring to Fig. 3 it will be noticed that these guard-members are attached so as to lie in planes converging toward the bottom of the saw. This converging of the guard-members is a very important feature of the invention, as by this arrangement accidental spreading displacement by contact edgewise with the guards is prevented, as the natural line of force applied at the edge would act to move the guards toward the saw.

The guards are held closed by coil-springs 20, in a manner which is well understood. Other closing devices may be employed, or the guards may be counter-weighted and closed by gravity.

In the operation of sawing or using a circular cutting tool of this nature, the lower protecting guards must be raised or moved to permit contact of the cutting edge of the tool with the work, and in this instance, provision is made to separate the guard-members by trigger mechanism which may be conveniently and naturally operated by the hand while holding the tool in operative position.

The guards are provided with projecting plates or ear-portions 22 between which is disposed and mounted to rotate horizontally, the spreader-plate 23. A modified form of this plate is shown in Fig. 7, which is provided with anti-friction rolls 23ª.

This plate is mounted on a shaft 24 journaled in the end of the saw-frame, and has attached to its opposite end the crank-arm 26. The operating-trigger 27 is mounted and adapted to slide in an open-slotted lug 28 which is connected to or is part of the frame, the trigger being held in said slot by a cotter-pin—two of such lugs are shown, one each side of the frame—and said trigger is fashioned into a form which adapts it for use in either lug, and which may be conveniently operated by the first finger of the hand which grasps the forward handle 11 when the handle is in either a right-handed or left-handed position. The trigger is connected to the crank-arm by pivot-bolt 29, and is provided with the spring 30 which is interposed between the lug 28 and a shoulder or stop 31 on the trigger. The spring 30 normally acts to hold the spreader in a position to permit full closing of the guards. Pulling on the trigger rotates the spreader-plate which forces apart the guard-members against the tension of springs 20; spring 30 being put under tension by this operation will return the plate to its normal position when the trigger is released by the finger, and the springs 20 will act to close the guards again.

From the foregoing description, it will be seen that the operator need rotate the spreader through trigger movement, only far enough to separate the guards to expose the saw to the work, and in so doing move the guards in such position that when brought into contact with the work, as shown in Figs. 3 and 5, they will naturally yield upwardly as the depth of the saw cut increases. The guards in this position prevent sidewise approach to the saw, and will close automatically when the saw is withdrawn from the cut, forming guards against edgewise contact.

The spreading mechanism is so devised that the trigger may be readily operated at the opposite side of the frame for left-hand use of the tool; and in Fig. 6, I have illustrated in dotted lines the left-hand position of these parts, it being understood that the handle 11 will also be transferred to that side of the frame. This is accomplished in the following manner:—Pivot 29 is removed to permit separation of the trigger and arm, and these parts are then transposed to an opposite position, as clearly shown by dotted lines in Fig. 6.

By my invention, I provide a safety guard for portable circular-saws or like cutting-tools, which forms a complete guard against contact with the cutting edge of the saw or tool when the saw or tool is out of the work, and the swinging guards provide sufficient protection to prevent accidental contact with the saw sidewise when the saw is in operation. The device is simple in construction; is not liable to get out of order; and can be easily and cheaply produced.

While I have herein described a particular form of actuating mechanism for operating the guards, it is to be understood that this operation may be accomplished in various ways, and the mechanism altered in details and relative arrangement of parts, within the scope of the appended claims.

What I claim is:

1. In a portable rotary-disk cutting-tool, the combination of a rotary cutting-disk and a longitudinally-divided guard for covering the cutting portions of said disk, the divided portions of said guard being adapted to swing laterally out of the way of the cutting path of the disk.

2. In a portable rotary-disk cutting-tool, the combination of a rotary cutting-disk and a longitudinally-divided yieldable guard covering the cutting portion of said disk, the divided portions of said guard being adapted to yield to expose the cutting-disk for the cutting operation.

3. In a portable rotary-disk cutting-tool, the combination of a rotary cutting-disk and a guard inclosing the cutting portion of said disk comprising swinging guard members arranged to separate in order to permit of the cutting operation.

4. In a portable rotary cutting-disk tool, the combination of a rotary cutting-disk, and a guard for inclosing the cutting portion of said disk comprising hinged members adapted to swing away from said disk, and means for spreading said members.

5. In a portable rotary cutting-disk tool, the combination of a rotary cutting-disk, and a guard for inclosing the cutting portion of said disk comprising hinged swinging guard-members, and means for normally holding closed said members, and means for spreading said members to expose the disk to the work.

6. In a portable rotary cutting-disk tool, the combination of a rotary cutting-disk, and a guard for inclosing the cutting portion of said disk comprising swinging guard-members, one member each side of said disk, and means interposed between said members for separating said members to expose the disk to the work.

7. In a portable rotary cutting-tool, the combination of a rotary cutting-disk mounted in a frame, a guard for the cutting portion of said disk comprising swinging guard-members hinged to said frame, said guard-members normally lying in converging planes, one member each side of said disk, and actuating means carried by the frame for initially separating the guard-members to expose the cutting portion of the disk to the work.

8. In a portable rotary cutting-disk tool, the combination of a rotary cutting-disk mounted in a frame, a guard for inclosing the cutting portion of said disk comprising hinged swinging guard-members, one member each side of said disk, a spreader interposed between said guard-members, and means carried by the frame for actuating said spreader.

In testimony whereof, I the said EMANUEL A. MARTIN, have hereunto set my hand.

EMANUEL A. MARTIN.

Witnesses:
 JOHN F. WILL,
 J. R. KELLER.